3,654,191
CURABLE EPOXIDE COMPOSITIONS COMPRISING A POLYEPOXIDE, AN N-GLYCIDYL- OR N-β-METHYLGLYCIDYL-OXAZOLIDIN-2-ONE AND AND EPOXIDE CURING AGENT

Juergen Habermeier, Allschwil, Hans Batzer, Arlesheim, Daniel Porret, Binningen, and Walter Kunz, Basel, Switzerland, assignors to Ciba Limited, Basel, Switzerland
No Drawing. Filed July 7, 1970, Ser. No. 52,935
Claims priority, application Switzerland, July 29, 1969, 11,563/69
Int. Cl. C08g 31/14
U.S. Cl. 260—2 N    6 Claims

ABSTRACT OF THE DISCLOSURE

Curable mixtures, which are suitable for the manufacture of shaped articles, coatings and adhesive bonds, and which comprise (a) a polyepoxide compound containing at least 2 epoxide groups, (b) an unsubstituted or substituted N-glycidyl- or N-β-methylglycidyl-oxazolidin-2-one compound, and (c) a curing agent for epoxide resins, such as a polyamine or a polycarboxylic anhydride.

---

The subject of the present invention are new curable mixtures which are suitable for the manufacture of shaped articles, coatings and adhesive bonds, characterised in that they contain (a) a polyepoxide compound containing at least 2 epoxide groups, (b) a heterocyclic N-glycidyl or N-β-methylglycidyl compound of formula

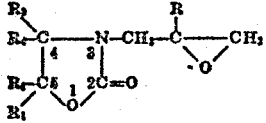

(I)

wherein R denotes a hydrogen atom or the methyl group, $R_1$ represents a hydrogen atom or an aliphatic, cycloaliphatic, araliphatic or aromatic radical which can be substituted by halogen atoms or heterocyclic rings or interrupted by hetero-atoms, such as oxygen, sulphur or nitrogen atoms, $R_2$ denotes a hydrogen atom, an alkyl radical, an alkenyl radical, a halogenalkyl radical or a phenyl radical which is optionally substituted by alkyl or halogen, and $R_3$ and $R_4$ each represent hydrogen atoms or lower alkyl groups with 1 to 4 carbon atoms, and (c) a curing agent for epoxide resins, such as a polyamine or a polycarboxylic anhydride.

The monoepoxides of Formula I represent more or less mobile liquids and are outstandingly suitable for use as reactive diluents for epoxide resins. The monoepoxides of Formula I can therefore advantageously be used as a mixture with other curable diepoxide or polyepoxide compounds. As such, there may for example be mentioned: polyglycidyl ethers and poly-β-methylglycidyl ethers of polyhydric alcohols, such as polyethylene glycols, polypropylene glycols or 2,2-bis-(4'-hydroxycyclohexyl)-propane; polyglycidyl ethers and poly-β-methylglycidyl ethers of polyhydric phenols, such as 2,2-bis(4'-hydroxyphenyl) - propane (=diomethane), 2,2-bis-(4'-hydroxy-3',5' - dibromophenyl) - propane, bis-(4-hydroxyphenyl)-sulphone, 1,1,2,2-tetrakis-(4-hydroxyphenyl) - ethane or condensation products of formaldehyde with phenols, manufactured in an acid medium, such as phenol novolacs or cresol novolacs; polyglycidyl esters and poly-β-methylglycidyl esters of polycarboxylic acids, such as for example phthalic acid diglycidyl ester, phthalic acid di-(β-methylglycidyl) ester, isophthalic acid diglycidyl ester, tetrahydrophthalic acid diglycidyl ester or hexahydrophthalic acid diglycidyl ester; triglycidylisocyanurate, N,N' - diglycidyl - 5,5 - dimethylhydantoin, aminopolyepoxides, such as a. obtained by dehydrohalogenation of the reaction products of epihalogenohydrin and primary or secondary amines, such as aniline or 4,4'-diaminodiphenylmethane; also, alicyclic compounds containing several epoxide groups, such as vinylcyclohexenediepoxide, dicyclopentadienediepoxide, ethylene glycolbis(3',4' - epoxytetrahydrodicyclopentadien - 8-yl)-ether, (3,4 - epoxycyclohexylmethyl) - 3,4 - epoxycyclohexanecarboxylate, (3',4' - epoxy - 6'-methylcyclohexylmethyl)-3,4 - epoxy - 6 - methylcyclohexanecarboxylate, bis-,2,3-epoxycyclopentyl) - ether or 3-(3',4'-epoxycyclohexyl)-2,4-dioxaspiro-(5.5)-9,10-epoxy-undecane.

The monoepoxides of Formula I are manufactured according to methods which are in themselves known. Here the preferred procedure is to react an epihalogenohydrin or β-methylepihalogenohydrin, preferably epichlorhydrin or β-methylepichlorhydrin, in the presence of an anionically active catalyst, such as preferably a tertiary amine or a quaternary ammonium salt, with a compound of formula

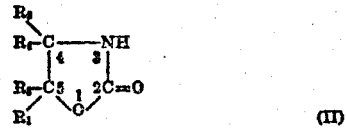

(II)

wherein $R_1$, $R_2$, $R_3$ and $R_4$ have the same significance as in Formula I, and, in a second stage, to treat the resulting product, containing halogenohydrin groups, with agents which split off hydrogen halide.

Here particularly good yields are obtained if an excess of epichlorhydrin or β-methylepichlorhydrin is used. During the first reaction, before the addition of alkali, a partial epoxidation of the dichlorhydrin or of the dichloro-β-methylhydrin of the oxazolidin-2-one already takes place. The epichlorhydrin or the β-methylepichlorhydrin, which act as hydrogen chloride acceptors, have then been partially converted into glycerine dichlorhydrin or β-methylglycerine dichlorhydrin.

The manufacture of the N-glycidyl compounds can be achieved particularly easily according to the process described above if starting from oxazolidin-2-ones of formula

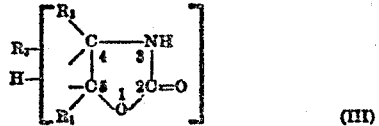

(III)

wherein the symbols $R_1$, $R_2$ and $R_3$ have the same significance as in Formula II. Here oxazolidin-2-ones of Formula III in which one of the three radicals $R_1$, $R_2$ and $R_3$ is a hydrogen atom, the two radicals $R_2$ and $R_3$ either denote hydrogen atoms or alkyl groups with 1 to 2 carbon atoms, and the radical $R_1$ represents hydrogen, alkyl with 1 to 2 carbon atoms, chloromethyl, phenyl or a radical of formula —CH₂—O—R₅, wherein R₅ is alkyl, phenyl or a phenyl radical substituted by alkyl and/or halogen, are particularly preferred as starting substances.

The N-unsubstituted oxazolidin-2-ones employed for the manufacture of the glycidyl compounds of Formula I can be manufactured according to the known methods (compare M. E. Dyen, D. E. Swern, Chem. Reviews 67 (2), 197–246 (1967).

Thus for example the preparations from ethanolamine or from ethanolamines which are substituted in the carbon skeleton, for example by one or more alkyl groups, either with phosgene or with urea [compare U.S.A. Pat. No. 3,133,932, R. C. Horn, S. M. Mofelt, L. E. Craig (1964)] or the manufacture from tris-(hydroxyethyl)-isocyanurates or tris-(hydroxypropyl)-isocyanurates [compare R. W. Cummins—J. Org. Chem. 28, 85–89 (1963)] take place with particularly advantageous yields.

Great scope for variation in the synthesis exists above all in the manufacture of oxazolidin-2-ones of formula

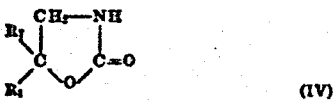

wherein $R_1$ has the same significance as in Formula I and $R_2$ represents a hydrogen atom or the methyl group, in that the substituted ethanolamines of formula

which are required for the synthesis with phosgene or urea are particularly conveniently accessible by reaction of monoepoxides of formula

with ammonia.

As monoepoxides of Formula VI there may for example be mentioned: ethylene oxide, propylene oxide, styrene oxide, phenyl-glycidyl-ether, cresyl-glycidyl-ether, n-butyl-glycidyl-ether, n-octyl-glycidyl-ether, isooctyl-glycidyl-ether, phenyl-($\beta$ - methylglycidyl)-ether, butyl-($\beta$-methylglycidyl) - ether, pentachlorophenyl-glycidyl-ether, acrylic acid glycidyl ester, and glycidyl esters of synthetic, highly branched, mainly tertiary aliphatic monocarboxylic acids ("Cardura E").

The addition of the epihalogenohydrin or the $\beta$-methylepihalogenohydrin to the oxazolidin-2-one can here take place according to known processes, with or without solvents, with a lesser or greater excess of epihalogenohydrin or $\beta$-methylepihalogenohydrin, at temperatures of up to 140° C., under the catalytic action of tertiary amines, quaternary ammonium salts, alkali halides and other anionically active catalysts, in 30 to 360 minutes. The subsequent dehydrohalogenation can be carried out at 40–70° C., with solid or liquid alkalis and optionally with the resulting water being azeotropically distilled off. The alkali halide is separated off in accordance with known processes.

The resulting 3-glycidyl- or 3-($\beta$-methylglycidyl)-oxazolidin-2-ones are isolated by distilling off the excess epihalogenohydrin or $\beta$-methylepihalogenohydrin respectively and, where appropriate, the solvent. They are obtained as more or less mobile liquids. N-glycidyl-oxazolidin-2-one is a very mobile liquid which can be purified by distillation and which is therefore especially well suited to use as a reactive diluent for epoxide resins.

Apart from acting as reactive diluents, the monoepoxides of Formula I act as cure accelerators on addition to certain epoxide resin-curing agent systems, for example curable mixtures of polyphenol-polyglycidyl-ethers and polycarboxylic anhydrides; furthermore the cured products are plasticised somewhat.

A particular advantage results when using N-glycidyloxazolidin-2-one as an additive to triglycidylisocyanurate/curing agent mixtures, because in that case the triglycidylisocyanurate already dissolves completely at relatively low temperatures (from 50–60° C. onwards); furthermore the gel time is lengthened by the addition of the new monoglycidyl compounds to triglycidylisocyanurate to such an extent (through lowering the functionality) that triglycidylisocyanurate can be used as a casting resin, which without such an addition is impossible or only possible using retarders or only permits technically reproducible cures to be carried out in a thin layer. The triglycidylisocyanurate/anhydride samples cured with the addition of N-glycidyloxazolidin-2-one at the same time even show (depending on mixing ratios) better mechanical properties than triglycidylisocyanurate/anhydride samples cured in a thin layer.

If desired it is possible conjointly to use, apart from the glycidyl- or $\beta$-methylglycidyl-oxazolidin-2-ones, yet other known reactive diluents, such as for example styrene oxide, butyl-glycidyl-ether, isooctyl-glycidyl-ether, cresyl-glycidyl-ether, or glycidyl esters of synthetic, highly branched, mainly tertiary aliphatic monocarboxylic acids ("Cardura E").

As suitable curing agents for the epoxide resin mixtures there may for example be mentioned: amines or amides, such as aliphatic, cycloaliphatic or aromatic, primary, secondary and tertiary amines, for example monoethanolamine, ethylenediamine, hexamethylenediamine, trimethylhexamethylenediamine, diethylenetriamine, triethylenetetramine, tetraethylenepentamine, N,N-dimethylpropylenediamine-1,3, N,N-diethylpropylenediamine-1,3, bis-(4-amino - 3 - methyl-cyclohexyl)-methane, 3,5,5-trimethyl-3-(aminomethyl)-cyclohexylamine ("isophoronediamine"), and Mannich bases such as 2,4,6-tris-(dimethylaminomethyl)-phenol; m-phenylenediamine, p-phenylenediamine, bis-(4-aminophenyl)-methane, bis-(4-aminophenyl)-sulphone, and m-xylylenediamine; N-(2-aminoethyl)-piperazine; adducts of acrylonitrile or monoepoxides, such as ethylene oxide or propylene oxide, to polyalkylenepolyamines, such as diethylenetriamine or triethylenetetramine; adducts of polyamines, such as diethylenetriamine or triethylenetetramine in excess and polyepoxides, such as diomethane-polyglycidyl-ethers; ketimines, for example from acetone or methyl ethyl ketone and bis(p-aminophenyl)-methane; adducts from monophenols or polyphenols and polyamines; polyamides, especially those from aliphatic polyamines, such as diethylenetriamine or triethylenetetramine and dimerised or trimerised unsaturated fatty acids, such as dimerised linseed oil fatty acid ("Versamid"); polymeric polysulphides ("Thiokol"); dicyandiamide or aniline-formaldehyde resins; polyhydric phenols, for example resorcinol, 2,2-bis-(4-hydroxyphenyl)-propane or phenol-formaldehyde resins; boron trifluoride and its complexes with organic compounds, such as $BF_3$-ether complexes and $BF_3$-amine complexes, for example $BF_3$-monoethylamine complex; acetoacetanilide-$BF_3$-complex; phosphoric acid; triphenylphosphite; polybasic carboxylic acids and their anhydrides, for example phthalic anhydride, $\Delta^4$-tetrahydrophthalic anhydride, hexahydrophthalic anhydride, 4-methylhexahydrophthalic anhydride (=methylnadicanhydride), 3,4,5, phthalic anhydride, methyl-3,6-endomethylene-$\Delta^4$-tetrahydrophthalic nhydride (=methylnadicanhydride), 3,4,5, 6,7,7 - hexachlor-3,6-endomethylene-$\Delta^4$-tetrahydrophthalic anhydride, succinic anhydride, adipic anhydride, azelaic anhydride, sebacic anhydride, maleic anhydride and dodecenyl-succinic anhydride; pyromellitic dianhydride or mixtures of such anhydrides.

Cure accelerators can furthermore be employed in the cure; when using polyamides, dicyandiamide, polymeric polysulphides or polycarboxylic anhydrides as curing agents, tertiary amines, their salts or quaternary ammonium compounds, for example 2,4,6-tris-(dimethylaminoethyl)-phenol, benzyldimethylamine, 2-ethyl-4-methylimidazole, 4-amino-pyridine, triamylammonium phenolate and also alkali metal alcoholates, such as for example sodium hexantriolate, are for example suitable for use as accelerators. When curing with amines, monophenols or polyphenols, such as phenol or diomethane, salicylic acid or isothiocyanates can for example be used as accelerators.

The mixtures of polyepoxide compound, N-glycidyl- or N-β-methylglycidyl-oxazolidin-2-ones as active diluents and curing agents can furthermore, in any stage before the cure, be mixed with the usual modifiers, such as extenders, fillers and reinforcing agents, pigments, dyestuffs, organic solvents, plasticisers, flow control agents, agents for conferring thixotropy, flameproofing substances or mould release agents.

As extenders, reinforcing agents, fillers and pigments which can be employed in the curable mixtures according to the invention, there may for example be mentioned: coal tar, bitumen, textile fibres, glass fibres, asbestos fibres, boron fibres, carbon fibres, cellulose, polyethylene powder, polypropylene powder; quartz powder; mineral silicates such as mica, asbestos powder and slate powder; kaolin, aluminium oxide trihydrate, chalk powder, gypsum, antimony trioxide, bentones, silica aerogel ("Aerosil"), lithopones, barytes, titanium dioxide, carbon black, graphite, oxide pigments, such as iron oxide, or metal powders, such as aluminium powder or iron powder.

Suitable organic solvents for the modification of the curable mixtures are, for example, toluene, xylene, n-propanol, butyl acetate, acetone, methyl ethyl ketone, diacetone-alcohol and ethylene glycol monomethyl ether, monoethyl ether and monobutyl ether.

As plasticisers for the modification of the curable mixtures, dibutyl, dioctyl and dinonyl phthalate, tricresyl phosphate, trixylenyl phosphate, and also polypropylene glycols can for example be employed.

As flow control agents when employing the curable mixtures, especially in surface protection, it is for example possible to add silicones, cellulose acetobutyrate, polyvinyl butyral, waxes, stearates and the like (which are in part also used as mould release agents).

Especially for use in the lacquer field, the diepoxide compounds can furthermore be partially esterified in a known manner with carboxylic acids, such as especially higher unsaturated fatty acids. It is furthermore possible to add other curable synthetic resins, for example phenoplastics or aminoplastics, to such lacquer resin formulations.

The curable mixtures according to the invention can be manufactured in the customary manner with the aid of known mixing equipments (stirrers, kneaders, rolls and the like).

The curable epoxide resin mixtures according to the invention are above all employed in the fields of surface protection, the electrical industry and laminating processes, and in the building industry. They can be used in a formulation suited in each case to the special end use, in the unfilled or filled state, where appropriate in the form of solutions or emulsions, as paints, lacquers, as compression moulding compositions, sintering powders, dipping resins, coating resins, injection moulding formulations, impregnating resins and binders, adhesives, tooling resins, laminating resins, sealing and filling compositions, floor covering compositions and binders for mineral aggregates.

In the examples which follow, unless otherwise stated, parts denote parts by weight and percentages denote percentages by weight. The relationship of parts by volume to parts by weight is as of the millimetre to the gram.

In order to determine the mechanical and electrical properties of the curable mixtures described in the examples which follow, sheets of size 92 x 41 x 12 mm. were manufactured for the determination of flexural strength, deflection, impact strength and water absorption. The test specimens (60 x 10 x 4 mm.) for the determination of the water absorption and for the flexural test and impact test (VSM 77,103 and VSM 77,105 respectively) were machined from the sheets.

For determining the heat distortion point according to Martens (DIN 53,458) test specimens of dimensions 120 x 15 x 10 mm. were cast in each case.

MANUFACTURE OF THE GLYCIDYLOXAZOLIDINONES

Example 1

A mixture of 217.5 g. of oxazolidin - 2 - one (=2-oxazolidinone) [2.5 mols], 3490 g. of epichlorhydrin (37.5 mols) [corresponding to a ratio of oxazolidin-2-one to epichlorhydrin of 1:15] and 8.21 g. of tetramethylammonium chloride (3 mol percent) is stirred for 3 hours at 117–120° C. A sample taken from the batch and freed of volatile constituents by a vacuum treatment then has an epoxide content of 3.0 equivalents/kg. The mixture is cooled to 60° C. and 123.8 g. of finely powdered sodium hydroxide (97% strength) [3.0 mols] are added in small portions over the course of 20 minutes with vigorous stirring. The water present in the reaction mixture is then separated off by azeotropic circulatory distillation, this being achieved in about 80 minutes at a temperature of 58–60° C. under 90–110 mm. Hg vacuum.

Thereafter the mixture is cooled and the sodium chloride produced in the reaction is separated off by filtration. The filtration residue is rinsed with a little epichlorhydrin. The combined epichlorhydrin solutions are concentrated at 80° C. under a slight vacuum on a rotary evaporator and are then treated at 50° C. to remove easily volatile constituents under 0.2 mm. Hg vacuum until constant weight is reached.

357.5 g. of a light brown liquid of low viscosity (100% of theory), having an epoxide content of 6.52 equivalents/kg. (93.4% of theory) are obtained.

The crude N-glycidyl-oxazolidin-2-one thus manufactured can be purified by vacuum distillation. At a boiling point of 115–117° C./0.21 mm. Hg, about 60% of the crude product employed distil. The purified N-glycidyl-oxazolidin-2-one has an epoxide content of 6.84 equivalents/kg. (97.9% of theory), and the total chlorine content is about 0.5%. The viscosity according to Höppler is 25.5 cp. at 20° C. and 10 cp. at 40° C.

The structure was proved by elementaly analysis, infrared spectrum, nuclear resonance spectrum and mass spectrum.

*Elementary analysis.*—Calculated (percent): C, 50.34, H, 6.34; Cl, 0.0. Found (percent): C, 50.41; H, 6.40; Cl, 0.5.

The infrared spectrum shows, through the absence of the NH frequency of the oxazolidin-2-one at 3,15μ and the presence of the frequencies for the glycidyl group, that the desired substance has been produced.

The nuclear magnetic resonance spectrum (60 mc. H—MR, recorded in deuterochloroform) shows the following signals:

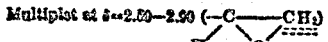

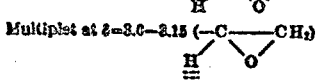

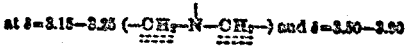

and also a triplet with the following fine structure

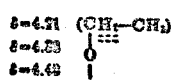

The mass spectrum shows a molecular weight (M) of 143 (theory 143.15) and also shows, through fragment ions at 126 (=M—OH), 113 (=M—CH$_2$O),

56 (=McLafferty rearrangement of the glycidyl radical) and 42 ($\triangleq$CH$_2$CO$^+$), that the resulting substance, namely N-glycidyl-oxazolidin-2-one, possesses the following structure:

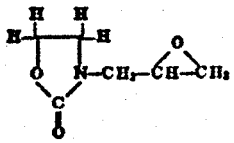

Example 2

A mixture of 100 g. of oxazolidin-2-one (1.15 mols), 2127.5 g. of epichlorhydrin (23.0 mols) [corresponding to a ratio of oxazolidin-2-one to epichlorhydrin of 1:20] and 3.78 g. of tetramethylammonium chloride is reacted as described in Example 1. The dehydrohalogenation is carried out, as in Example 1, with 56.4 g. of 97% strength finely powdered sodium hydroxide. The product is worked-up and isolated as described in Example 1. A clear, light brown liquid with 6.38 epoxide equivalents/kg. (91.3% of theory) is obtained in 100% yield (164.5 g.). Vacuum distillation yields a product with a boiling point of 117–118° C. at 0.27 mm. Hg, in a distillation yield of 67.7%. The N-glycidyloxazolidin-2-one purified in this way possesses 6.98 epoxide equivalents (99.8% of theory).

Example 3

A mixture of 26.1 g. of oxazolidin-2-one (0.3 mol), 555 g. of epichlorhydrin (6.0 mols) and 0.99 g. of tetramethylammonium chloride (3 mol percent) is stirred at 60° C. At the same time a circulatory distillation is started by applying a vacuum (90–100 mm. Hg), so that water which is present in the reaction mixture can be removed continuously. Immediately, 28.8 g. of 50% strength sodium hydroxide solution (0.36 mol) are slowly added dropwise over the course of 3 hours. The reaction mixture is then cooled and worked-up as described in Example 1. 36.2 g. of a yellowish-coloured liquid (84.4% of theory) having an epoxide content of 4.03 equivalents/kg. (58.5% of theory) are obtained.

Example 4

43.5 g. of oxazolidin-2-one (0.5 mol) are mixed with 174 ml. of chloroform and 0.5 ml. of a 47% strength solution of boron fluoride-diethyl etherate in diethyl ether is added. This mixture is stirred at 60° C. 50.9 g. of epichlorhydrin (0.55 mol) are then slowly added dropwise over the course of 35 minutes. 0.1 ml. of the boron fluoride-etherate solution is then again added and the mixture stirred for a further hour at 50–55° C. Thereafter dehydrohalogenation is carried out with 24.8 g. of 97% strength sodium hydroxide powder, as described in Example 1. The working-up and isolation of the oxazolidin-2-one derivative takes place in accordance with Example 1 and 34.3 g. (47.6% of theory) of a light brown liquid with 3.50 epoxide equivalents/kg. (50.1% of theory) are obtained.

Example 5

A mixture of 87.0 g. of oxazolidin-2-one (1 mol), 1597.9 g. of β-methylepichlorhydrin (15 mols) and 4.97 g. of tetraethylammonium chloride is stirred for 12 hours at 118–122° C. A sample withdrawn from the batch and freed of volatile constituents by vacuum treatment then has an epoxide content of 1.75 equivalents/kg. The mixture is cooled to 60° C. and 49.5 g. of finely powdered sodium hydroxide (97% strength) [1.2 mols] are added in small portions over the course of 20 minutes with vigorous stirring. Thereafter the water present in the reaction mixture is separated off by azeotropic circulatory distillation, this being achieved in about 40 minutes, at a temperature of 58–61° C. under 82–84 mm. Hg.

The mixture is then cooled and the sodium chloride produced in the reaction removed by filtration. The filtration residue is rinsed with a little β-methylepichlorhydrin. The combined solutions are concentrated on a rotary evaporator at a bath temperature of 80° C. under a slight vacuum, and the excess β-methylepichlorhydrin is collected. Thereafter the residue is treated at 50° C. under 0.2 mm. Hg until constant weight is reached.

137.6 g. of crude N-(β-methylglycidyl)oxazolidin-2-one (87.6% of theory) are obtained as a light brown, clear oil. The epoxide content is 5.55 equivalents/kg. (87.1% of theory).

This crude product can be purified by vacuum distillation. 66.3% of the crude material employed distil under constant conditions at 93° C./0.12 mm. Hg. The N-(β-methylglycidyl)-oxazolidin-2-one purified in this way has an epoxide content of 6.18 equivalents/kg.; this corresponds to 97.1% of theory.

The infrared spectrum shows, through the absence of the N—H frequency of the oxazolidin-2-one and through the presence of the absorptions of the methylglycidyl structure, that the reaction has followed the desired course.

The nuclear magnetic resonance spectrum (60 mc. H—NMR, recorded in CDCl$_3$) shows through the following signals that the product has the formula given below:

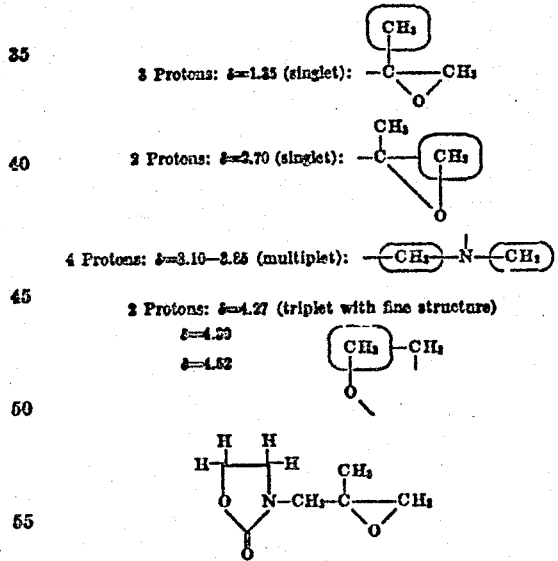

Example 6

25.75 g. of 5-chloromethyl-oxazolidin-2-one (0.19 mol) [manufactured from epichlorhydrin and potassium cyanate according to A. L. Thomsen, Ber. 11, 2136 (1878)] together with 263.5 g. of epichlorhydrin (2.85 mols) and 2.39 g. of 40% strength benzyltrimethylammonium hydroxide solution in methanol (3 mol percent) are stirred for 3 hours at 114–116° C. The mixture is then cooled to 60° C. and dehydrohalogenated with 9.4 g. of finely powdered 97% strength sodium hydroxide (0.228 mol), as described in Example 1. Working-up takes place in accordance with Example 1.

32.8 g. of a mobile oil are obtained (90.2% of theory). The epoxide content of the 3-glycidyl-5-chloromethyloxazolidin-2-one manufactured in this way is 4.85 equivalents/kg. (93.2% of theory). The substance contains 18.1% of chlorine (theory 18.4%).

The infrared spectrum shows, through the absence of the NH absorption and the presence of epoxide absorptions, that the reaction has followed the desired course. No absorptions are detectable in the C=C region, so that practically no chlorine is eliminated from the chloromethyl group.

The nuclear magnetic resonance spectrum shows the presence of the following signals:

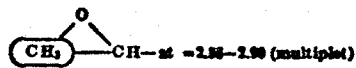

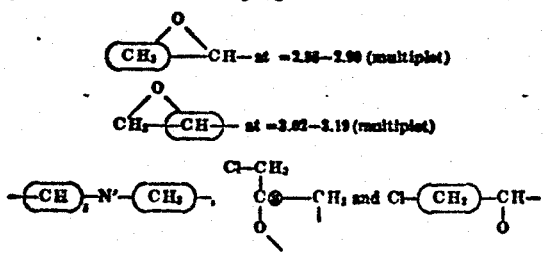

in multiplets between δ: 3.20 and 5.05, that the formula given below applies:

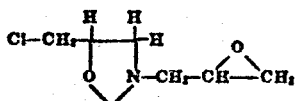

Example 7

A mixture of 2.0 g. of 5-methyl-oxazolidin-2-one (0.02 mol), 37.0 g. of epichlorhydrin (0.4 mol) and 0.14 g. of benzyltrimethylammonium chloride (3 mol percent) is stirred for 2 hours at 114–116° C. Thereafter dehydrohalogenation is carried out with 0.99 g. of finely powdered 97% strength sodium hydroxide—as described in Example 1—and the mixture worked-up in accordance with Example 1.

3-glycidyl-5-methyl-oxazolidin-2-one is obtained in the form of a pale yellow oil. The epoxide content of the crude product is 4.02 equivalents/kg. (63.1% of theory).

The infrared spectrum shows that the resulting product essentially corresponds to the formula below. However, the crude product is still contaminated with a little unreacted starting substance (weak NH absorption at 3.0μ).

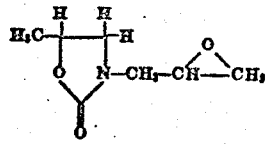

Example 8

A mixture of 80.5 g. of 4-ethyl-oxazolidin-2-one (0.7 mol), 2.3 g. of tetramethylammonium chloride and 972 g. of epichlorhydrin (10 mols) is stirred for 4 hours under reflux at 116–118° C. A sample taken from the batch and freed of volatile constituents then has an epoxide content of 1.65 equivalents per kg.

The mixture is now cooled to 60° C. and 34.6 g. of 97% strength sodium hydroxide powder (0.84 mol) are stirred in over the course of 30 minutes. Thereafter the water produced in the reaction is removed from the batch by azeotropic circulatory distillation, this being achieved in 55 minutes at a temperature of 58° C. at 80–100 mm. Hg. The mixture is cooled and the sodium chloride produced in the reaction is removed by filtration. The solution is concentrated on a rotary evaporator at 60–100° C. under 17 mm. Hg and is freed of volatile constituents.

123.0 g. of crude 3-glycidyl-4-ethyl-oxazolidin-2-one (theory 119.7 g.) having an epoxide content of 5.52 equivalents per kg. (94.3% of theory) are obtained as a brown oil.

The product can be purified by distillation. At 0.14 mm. Hg, 96.5% of the crude material employed distil between 107–110° C. This purified 3-glycidyl-4-ethyl-oxazolidin-2-one is slightly yellow and possesses 5.56 epoxide equivalents/kg. (95% of theory); the total chlorine content is 0.8%.

The nuclear magnetic resonance spectrum (60 mc. H—NMR, recorded in CDCl₃) shows, through the absence of the signal for the proton on the N, which appears at δ=6.95 (60 mc., CDCl₃) in the N-unsubstituted 4-ethyl-oxazolidin-2-one, and through the presence of the following signals, that the product has the structure given below.

3 Protons: δ=0.80 (triplet, J=0.91 with J=1.06 fine structure): 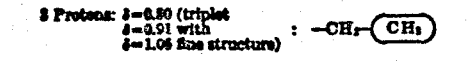

2 Protons: δ=1.28–2.09 (multiplet): 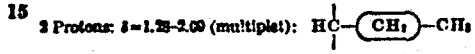

2 Protons: δ=2.83–2.95 (multiplet): 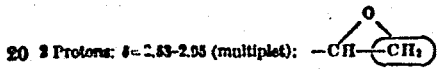

1 Proton: δ=3.02–3.20 (multiplet): 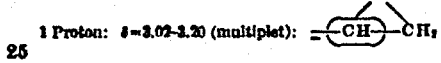

5 Protons: δ=3.40–4.70 (multiplets) 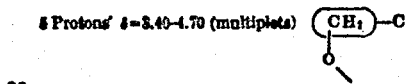

and 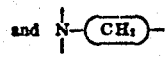

and 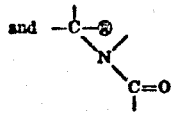

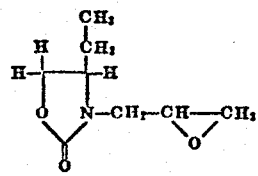

Example 9

A mixture consisting of 57.5 g. of 4,4-dimethyl-oxazolidin-2-one (0.5 mol), 1.65 g. of tetramethylammonium chloride and 694 g. of epichlorhydrin (7.5 mols) is stirred under reflux for 4 hours and 45 minutes at 116° C. to 119° C. A sample freed of easily volatile constituents then shows an epoxide content of 1.59 equivalents/kg. The dehydrohalogenation is then carried out with 24.8 g. of 97% strength sodium hydroxide powder (0.6 mol) as described in Example 1. The mixture is worked-up according to Example 1 and 83.5 g. of crude 3-glycidyl-4,4-dimethyl-oxazolidin-2-one (100% of theory), having an epoxide content of 5.56 equivalents per kg. (95.1% of theory) are obtained.

This product can be purified by distillation. At 0.12 mm. Hg, 72.8% of the crude product employed distil between 93 and 96° C. The distilled product is a pale yellow oil, of which the epoxide content is 5.79 equivalents/kg. (99.2% of theory).

The infrared spectrum shows inter alia through the complete disappearance of the N—H absorption at 3.10μ that the reaction has followed the desired course.

The proton-magnetic resonance spectrum (60 mc. H—NMR, recorded in deuterochloroform) shows, through the absence of the signal for the N—H grouping at δ=6.92 (60 mc., CDCl₃) which is present in the starting compound, and through the presence of the following signals, that the structure given below applies.

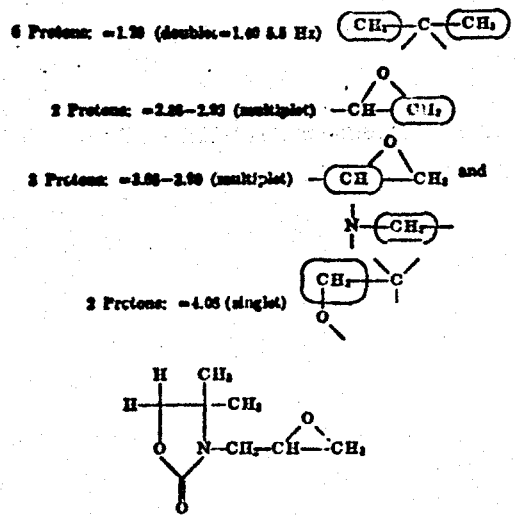

Example 10

A mixture of 29.4 g. of 5-phenyl-oxazolidin-2-one (0.18 mole), 0.6 g. of tetramethylammonium chloride and 249.6 g. of epichlorhydrin (2.7 mols) is stirred for 4 hours at 117–119° C. under reflux. A sample withdrawn from the batch and freed of volatile constituents then shows an epoxide content of 2.31 equivalents/kg. The dehydrohalogenation is carried out with 8.92 g. of 97% strength sodium hydroxide powder (0.216 mol) according to Example 1. The mixture is worked-up as described in Example 1.

A brown viscous product having an epoxide content of 4.31 equivalents/kg. (94.5% of theory) is obtained in 96.5% yield (38.0 g.).

The product can be distilled, and its boiling point is 175–177° C. at 0.25 mm. Hg.

Infrared and nuclear magnetic resonance spectra show, through the disappearance of the N—H function at 3.04μ and at δ=6.75 (60 mc., CDCl₃) respectively, that the reaction has, as desired, led to the following product:

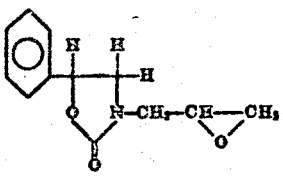

USE EXAMPLES

Example I 3 parts of a diomethane-diglycidyl ether manufactured by condensation of epichlorhydrin with 2,2-bis-(p-hydroxyphenyl)-propane (=diomethane) in the presence of alkali, which is liquid at room temperature and has an epoxide content of 5.40 epoxide equivalents and a viscosity at 25° C. of about 9000 cp. (=epoxide resin A) are mixed with 1 part of the 97.9% pure N-glycidyl-oxazolidin-2-one manufactured according to Example 1 [=sample 1(a)] and the viscosity of the mixture at 40° C. is compared with the viscosity of the pure epoxide resin A at       C. [=sample 2(a)]:

Viscosity according to Hoeppler at 40° C., cp.
Sample 1(a) ------------------------------ 263
Sample 2(a) (state of the art) ------------ 1573

The sample 1(a) (3 parts of epoxide resin A+1 part of N-glycidyl-oxazolidin-2-one) was fused with hexahydrophthalic anhydride (0.85 mol per 1 epoxide equivalent) at 80° C. to give a casting resin mixture [=sample 1(b)], poured into prewarmed aluminum moulds, and cured in accordance with the following temperature program: 2 hours at 80° C.+2 hours at 100° C.+2 hours at 120° C.+15 hours at 150° C.

For comparison, a mixture of pure epoxide resin A and 0.85 mol of hexahydrophthalic anhydride per 1 epoxide equivalent [=sample 2(b)] was cured in accordance with the same program. The properties of the cured castings were as follows:

|  | Sample 1(b) (with N-glycidyloxazolidin-2-one) | Sample 2(b) (state of the art) |
|---|---|---|
| Flexural strength according to VSM 77,103 (kp./mm.²) | 18.3 | 15.6 |
| Deflection (mm.) | 8.7 | 8.1 |
| Impact strength according to VSM 77,103 (cm. kp./cm.²) | 7.8 | 6.0 |
| Heat distortion point according to Martens DIN 53,458 (° C.) | 83 | 102 |

The experiments show that an addition of N-glycidyloxazolidin-2-one greatly lowers the viscosity of epoxide resins and that cured castings show better flexural properties compared to those without glycidyloxazolidin-2-one. Furthermore the gel time is lowered by the addition of N-glycidyloxazolidin-2-one.

Example II 3 parts of a technical cycloaliphatic epoxide resin which is liquid at room temperature, essentially consists of the diepoxide of formula

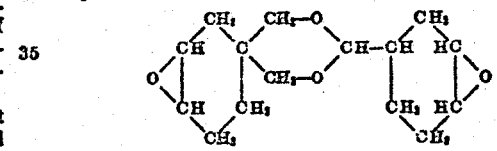

and possesses the following characteristics:

Epoxide content: 6.47 epoxide equivalents/kg.
Viscosity at 25° C.: about 100,000 cp. (=epoxide resin B)

were mixed with 1 part of N-glycidyloxazolidin-2-one (97.9% strength) [=sample 3(a)] and the viscosity of the mixture was compared at 40° C. with the viscosity of the pure epoxide resin B at 40° C. [=sample 4(a)]:

Viscosity according to Hoeppler at 40° C., cp.
Sample 3(a) ------------------------------ 622
Sample 4(a) (state of the art) ------------ 1443

Casting resin mixtures 3(b) and 4(b) were manufactured from the samples 3(a) and 4(a) analogously to Example I by mixing in each case with 0.85 mol of hexahydrophthalic anhydride per 1 epoxide equivalent, and the mixtures were poured into aluminium moulds and cured in accordance with the same temperature program as in Example I.

The properties of the cured castings are as follows:

|  | Sample 3(b) (with N-glycidyloxazolidin-2-one) | Sample 4(b) (state of the art) |
|---|---|---|
| Flexural strength according to VSM 77,103 (kp./mm.²) | 7.9 | 2.0 |
| Deflection (mm.) | 2.6 | 1.9 |
| Heat distortion point according to Martens DIN 53,458 (° C.) | 153 | 172 |
| Boiling water absorption (1 hour) in percent | 0.54 | 0.81 |

Here again a significant improvement of the mechanical properties is found in sample 3(b) with N-glycidyloxazolidin-2-one, as against sample 4(b) according to the state of the art (plasticisation).

Example III 1 parts of a technical epoxide resin which is liquid at room temperature, essentially consists of Δ⁴-tetrahydrophthalic acid diglycidyl ester of formula $$\text{(structure: Δ⁴-tetrahydrophthalic acid diglycidyl ester)}$$

and possesses the following characteristics:

Epoxide content: 6.49 epoxide equivalents/kg.
Viscosity at 25° C.: 450–550 cp. (=epoxide resin C)

were mixed with 1 part of N-glycidyl-oxazolidin-2-one (97.9% strength) [=sample 5(a)] and the viscosity of the mixture at 40° C. was compared with the viscosity of the pure epoxide resin B at 40° C. [=sample 6(a)]:

|  | Viscosity according to Hoeppler at 40° C., cp. |
|---|---|
| Sample 5(a) | 10 |
| Sample 6(a) (state of the art) | 58 |

Casting resin mixtures 5(b) and 6(b) were manufactured from samples 5(a) and 6(a) analogously to Example I by mixing with 0.85 mol of hexahydrophthalic anhydride per 1 epoxide equivalent, and the mixtures were poured into aluminium moulds and cured according to the same temperature program as in Example I.

The properties of the cured castings are shown in the following table:

|  | Sample 5(b) (with N-glycidyloxazolidin-2-one) | Sample 6(b) (state of the art) |
|---|---|---|
| Flexural strength according to VSM 77,103 (kp./mm.²) | 18.1 | 16.4 |
| Impact strength according to VSM 77,105 (cm. kp./cm.²) | 8.3 | 6.6 |
| Heat distortion point according to Martens DIN 53,458 (° C.) | 70 | 80 |

Here again a distinct plasticising effect is observed in the sample with N-glycidyl-oxazolidin-2-one relative to the sample according to the state of the art.

Example IV

The gel times of the mixtures, listed in the table below, of crystalline triglycidylisocyanurate (TGIC) and N-glycidyl-oxazolidin-2-one (97.9% purity) were investigated varying the mutual quantity ratios, 0.85 mol of hexahydrophthalic anhydride per 1 epoxide equivalent of the mixture being added to all samples (samples 8–12). For comparison, the gel time of a curable mixture of triglycidylisocyanurate and 0.85 mol of hexahydrophthalic anhydride per 1 epoxide equivalent was investigated (sample 7):

| Number | Parts of TGIC | Parts of N-glycidyloxazolidin-2-one | Gel time¹ Minutes | ° C. |
|---|---|---|---|---|
| 7 | 1 | 0 | 3 | 80 |
| 8 | 10 | 1 | 10 | 80 |
| 9 | 4 | 1 | 15 | 80 |
| 10 | 2 | 1 | 100 | 80 |
| 11 | 1 | 1 | 120 | 80 |
| 12 | 1 | 3 | 120 | 80 |

¹ In each case, 100 g. of resin/curing agent mixture. Curing agent=0.85 mol of hexahydrophthalic anhydride per epoxide equivalent.

The gel time is understood as the time at which a metal rod pressed onto the surface of the sample no longer sinks in.

Portions of sample 7 (state of the art) as well as of samples 10 and 11 (with N-glycidyl-oxazolidin-2-one) were poured into aluminium moulds and cured to give castings, with the following conditions being used:

Sample 7 was cured in an aluminium mould of high wall thickness, as a 4 mm. thick layer, and mixtures 4 and 5 were cured in thin-walled aluminium moulds (0.1 mm. wall thickness) as a 10 mm. thick layer. The cure conditions for mixture 1 are: 3 hours at 80° C.+16 hours at 140° C. Samples 10 and 11 were cured in 2 hours at 80° C.+2 hours at 100° C.+1 hour at 120° C.+15 hours at 150° C.

The properties of the cured castings can be seen from the table which follows:

|  | Sample ⁺7 | Sample 10 | Sample 11 |
|---|---|---|---|
| Flexural strength according to VSM 77,103 (kp./mm.²) | 7.3 | 12.0 | 9.6 |
| Deflection (mm.) | 2.5 | 4.4 | 3.1 |
| Impact strength according to VSM 77,105 (cm. kp./cm.²) |  | 7.8 | 10.5 |
| Heat distortion point according to Martens DIN 53,458 (° C.) |  | 156 | 97 |
| Boiling water absorption (1 hour) in percent | 0.4 | 0.4 |  |

⁺ State of the art.

Thus here again the mechanical properties of the castings based on TGIC are considerably improved by the addition of N-glycidyloxazolidin-2-one. At the same time, as already mentioned, the technical use properties desired for casting resin applications (sufficiently long pot life) are altogether only achieved by the addition of N-glycidyl-oxazolidin-2-one.

We claim:

1. A composition of matter which comprises (a) a polyepoxide containing at least two 1,2-epoxide groups, (b) a heterocyclic N-glycidyl or N-β-methylglycidyl compound of formula $$\text{(structure)}$$

wherein R represents a hydrogen atom or the methyl group, $R_1$ and $R_2$ each represents a member selected from the group consisting of hydrogen atom, alkyl with 1 to 4 carbon atoms, halogenalkyl with 1 to 4 carbon atoms, cyclohexyl and phenyl, and $R_3$ and $R_4$ each represents a member selected from the group consisting of hydrogen atom and alkyl with 1 to 4 carbon atoms, and (c) a curing agent for epoxide resins selected from the class consisting of polyamine and polycarboxylic anhydride.

2. A composition as claimed in claim 1, which contains diomethane-diglycidyl-ether as the polyepoxide (a).

3. A composition as claimed in claim 1, which contains 3-(3',4'-epoxycyclohexyl)-2,4-dioxaspiro-(5,5)-9,10-epoxyundecane as the polyepoxide (a).

4. A composition as claimed in claim 1, which contains Δ⁴-tetrahydrophthalic acid diglycidyl ester as the polyepoxide (a).

5. A composition as claimed in claim 1 which contains triglycidylisocyanurate as the polyepoxide (a).

6. A composition as claimed in claim 1 which contains 3(N)-glycidyl-oxazolidin-2-one as the heterocyclic N-glycidyl compound (b).

References Cited

UNITED STATES PATENTS 3,413,377   11/1968   Schramm et al. ---- 260—78.4 EP

WILLIAM H. SHORT, Primary Examiner

T. E. PERTILLA, Assistant Examiner

U.S. Cl. X.R.

117—128.4, 161 ZB; 161—184; 260—9 R, 28, 30.4 EP, 30.6 R, 31.2 R, 32.8 EP, 33.4 EP, 33.6 EP, 47 EA, 47 EN, 59, 77.5 R, 78.4 EP, 80 R, 830 TIN, 831, 834